United States Patent
Eiro et al.

(10) Patent No.: US 9,753,808 B2
(45) Date of Patent: Sep. 5, 2017

(54) DATA PROCESSING DEVICE HAVING RESETTING FEATURE WITHOUT INTERFERING WITH USER INTERFACE UNIT

(71) Applicant: DENSO CORPORATION, Kariya, Aichi-pref. (JP)

(72) Inventors: Takeo Eiro, Kariya (JP); Ichiro Yoshida, Takahama (JP); Kiyohiko Sawada, Nagoya (JP)

(73) Assignee: DENSO CORPORATION, Kariya (JP)

(*) Notice: Subject to any disclaimer, the term of this patent is extended or adjusted under 35 U.S.C. 154(b) by 156 days.

(21) Appl. No.: 14/442,134

(22) PCT Filed: Nov. 6, 2013

(86) PCT No.: PCT/JP2013/006539
§ 371 (c)(1),
(2) Date: May 12, 2015

(87) PCT Pub. No.: WO2014/087576
PCT Pub. Date: Jun. 12, 2014

(65) Prior Publication Data
US 2016/0004600 A1    Jan. 7, 2016

(30) Foreign Application Priority Data

Dec. 6, 2012    (JP) .................................. 2012-267192

(51) Int. Cl.
*G06F 11/00*    (2006.01)
*G06F 11/14*    (2006.01)
(Continued)

(52) U.S. Cl.
CPC ............ *G06F 11/1441* (2013.01); *G06F 1/26* (2013.01); *G06F 1/3293* (2013.01);
(Continued)

(58) Field of Classification Search
CPC .... G06F 11/0751; G06F 11/1441; G06F 1/28; G06F 1/30
(Continued)

(56) References Cited

U.S. PATENT DOCUMENTS 6,760,846 B1 *  7/2004  Yoshida .................... G06F 1/26
                                                713/300
8,498,772 B2 *  7/2013  Kanemoto .......... F02N 11/0825
                                                701/29.1
(Continued)

FOREIGN PATENT DOCUMENTS

JP    H01-177645 A    7/1989
JP    H11-143739 A    5/1999
(Continued)

OTHER PUBLICATIONS

International Search Report and Written Opinion of the International Searching Authority dated Jan. 28, 2014 issued in the corresponding International application No. PCT/JP2013/006539 (and English translation).

*Primary Examiner* — Elmira Mehrmanesh
(74) *Attorney, Agent, or Firm* — Posz Law Group, PLC

(57) ABSTRACT

A data processing device includes a digital data processing unit and a control unit. The digital data processing unit includes a computing unit that computes digital data and a power source management unit that transceives commands with the computing unit and manages a power supply to the computing unit. The control unit controls a user interface unit that provides a user interface function. The control unit diagnoses an operation of the digital data processing unit by monitoring a transfer state of the commands between the computing unit and the power source management unit. When determining an abnormality occurrence in the operation of the digital data processing unit, the control unit resets
(Continued)

all parts of the digital data processing unit or a part of the digital data processing unit without interrupting an operation of the user interface unit.

14 Claims, 4 Drawing Sheets

(51) Int. Cl.
*G06F 1/32* (2006.01)
*G06F 1/26* (2006.01)
*G06F 11/30* (2006.01)

(52) U.S. Cl.
CPC ...... *G06F 11/3058* (2013.01); *G06F 2201/85* (2013.01); *G06F 2201/86* (2013.01); *Y02B 60/121* (2013.01)

(58) Field of Classification Search
USPC ..................................... 714/22, 23
See application file for complete search history.

(56) References Cited

U.S. PATENT DOCUMENTS

| | | | |
|---|---|---|---|
| 8,607,015 B2 * | 12/2013 | Miyata | G11B 19/02 |
| | | | 711/166 |
| 2005/0081115 A1 | 4/2005 | Cheng et al. | |
| 2009/0198407 A1 | 8/2009 | Sakai et al. | |
| 2011/0246820 A1 * | 10/2011 | Murao | G06F 11/1637 |
| | | | 714/10 |

FOREIGN PATENT DOCUMENTS

| | | |
|---|---|---|
| JP | 2001-195274 A | 7/2001 |
| JP | 2002-041329 A | 2/2002 |
| JP | 2006-277115 A | 10/2006 |
| JP | 2009-003592 A | 1/2009 |
| JP | 2011-022934 A | 2/2011 |
| JP | 2011-159136 A | 8/2011 |

* cited by examiner

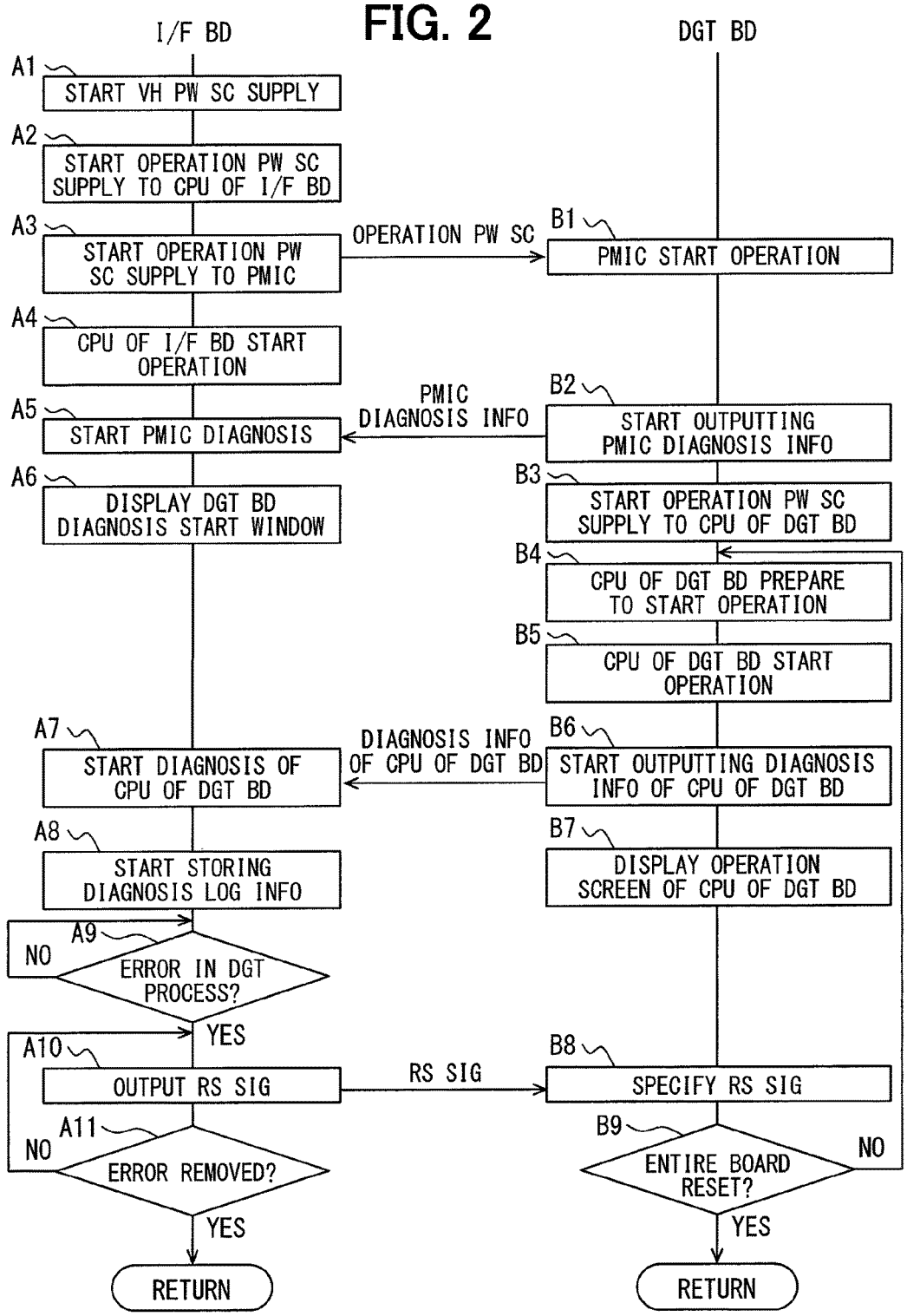

DATA PROCESSING DEVICE HAVING RESETTING FEATURE WITHOUT INTERFERING WITH USER INTERFACE UNIT

CROSS REFERENCE TO RELATED APPLICATION

This application is a U.S. national stage of International Application No. PCT/JP2013/006539 filed on Nov. 6, 2013 and is based on Japanese Patent Application No. 2012-267192 filed on Dec. 6, 2012, the disclosures of which are incorporated herein by reference.

TECHNICAL FIELD

The present disclosure relates to a data processing device that includes a digital data processing unit. The digital data processing unit includes a computing unit that computes digital data and a power source management unit that manages a power source of the computing unit, and the computing unit and the power source management unit transmit commands to each other.

BACKGROUND ART

Conventionally, there are provided data processing devices as various electronic devices such as personal computers and smart phones. Some of these data processing devices include a digital data processing unit that processes high-capacity digital data such as image data and music data. On a personal computer, for example, the digital data processing unit may operate abnormally. In such case, a user can press a reset button to reset the digital data processing unit (and recover from the error).

For example, a vehicle may be mounted with the data processing device such as a vehicle navigation system. In this case, the reset manipulation may interrupt driver's concentration on driving every when the driver is required to perform the manipulation to recover the digital data processing unit that operates abnormally. As a reset method, patent literature 1 discloses the configuration of providing a monitoring microcomputer to monitor a microcomputer. According to this configuration, the monitoring microcomputer monitors whether or not the microcomputer operates abnormally. When an error occurs, the monitoring microcomputer resets the abnormal operation of the microcomputer.

The method disclosed in patent literature 1 can reset an abnormal operation of a microcomputer without a user's reset operation. However, the digital data processing unit including a user interface function may, for example, disable acceptance of manipulation made by a user or disable switchover of display windows while the abnormal operation of the digital data processing unit being reset. Thus, during the reset operation of the digital data processing unit, user interface function is disabled temporarily.

PRIOR ART LITERATURES

Patent Literature

[Patent Document 1] JP-2011-22934 A

SUMMARY OF INVENTION

In view of the foregoing difficulties, it is an object of the present disclosure to provide a data processing device which is able to properly reset a digital data processing unit that processes digital data in response to an abnormality occurred in the digital data processing unit and properly provides user interface function during the resetting of the digital data processing unit.

According to an aspect of the present disclosure, a data processing device includes a digital data processing unit and a control unit. The digital data processing unit includes a computing unit that computes digital data and a power source management unit that transmits or receives commands to or from the computing unit and manages a power supply to the computing unit. The control unit controls a user interface unit that provides a user interface function. The control unit diagnoses an operation of the digital data processing unit by monitoring a transfer state of the commands between the computing unit and the power source management unit. When determining an abnormality occurrence in the operation of the digital data processing unit, the control unit resets all parts of the digital data processing unit or a part of the digital data processing unit without interrupting an operation of the user interface unit.

With the above device, when an abnormality occurs to a digital data processing unit that processes digital data, the digital data processing unit can be properly reset and user interface function is properly provided without interrupt during the resetting of the digital data processing unit.

BRIEF DESCRIPTION OF DRAWINGS

The above and other objects, features and advantages of the present invention will become more apparent from the following detailed description made with reference to the accompanying drawings. In the drawings:

FIG. 2 is a sequence diagram illustrating processes performed on an interface board and a digital board;

EMBODIMENTS FOR CARRYING OUT INVENTION

The following will describe embodiment of the present disclosure with reference to the accompanying drawings. In the following embodiments, a data processing device according to the present disclosure is applied to a vehicular data processing device that is mountable to a vehicle.

Figure 1:
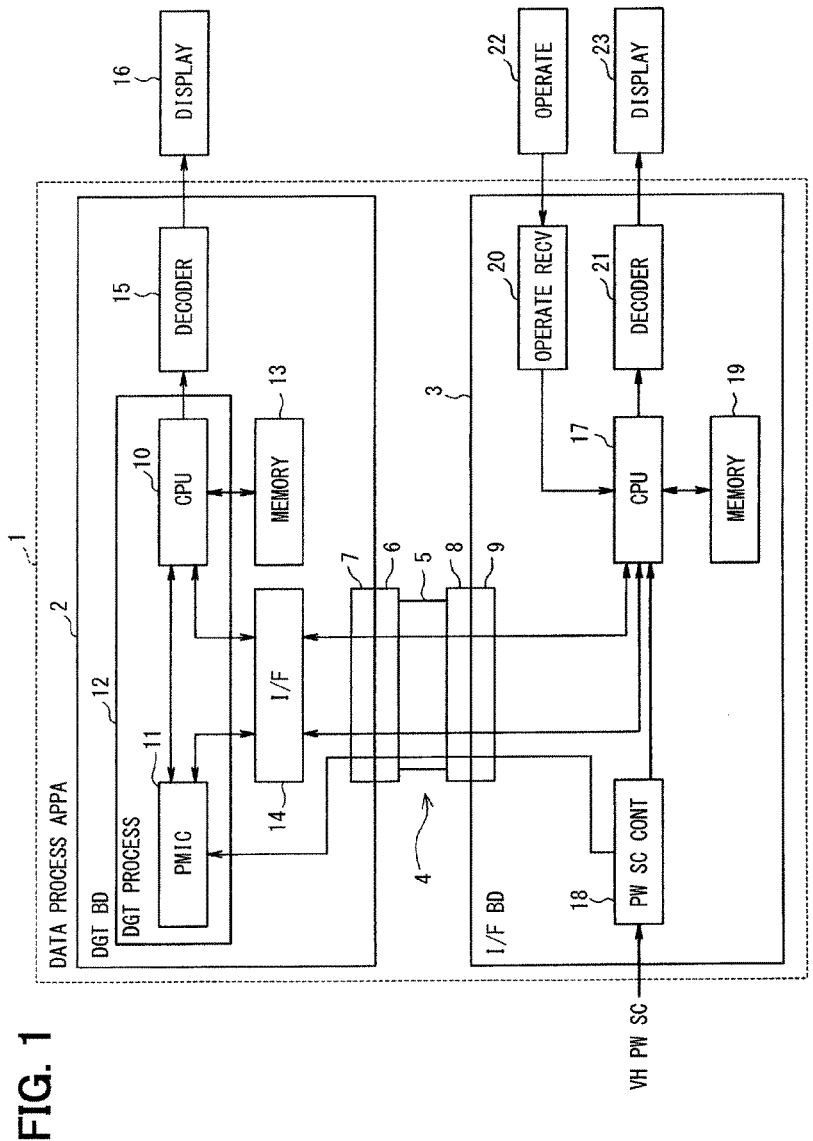
FIG. 1 is a block diagram illustrating a data processing device according to an embodiment of the present disclosure.

A vehicular data processing device (DATA PROCESS APPA) 1 is mountable to a vehicle and includes a digital board 2 (DGT BD) and an interface board 3 (I/F BD) as shown in FIG. 1. The digital board 2 corresponds to a first board. The interface board 3 corresponds to a second board. Being mountable on a vehicle signifies being permanently mounted on a vehicle or being detachably mounted on a vehicle. The digital board 2 is connected with the interface board 3 in a detachable manner via a connection cable 4. A connector 6 is provided at one end of a cable body 5 of the connection cable 4 and is connected to a connector 7 of the digital board 2. A connector 8 is provided at the other end of the cable body 5 of the connection cable 4 and is connected to a connector 9 of the interface board 3. With this configuration, the digital board 2 and the interface board 3 are communicably connected with each other so as to be capable of transferring data to each other.

The digital board 2 is equipped with a digital data processing unit (DGT PROCESS) 12, which includes a central processing unit (CPU) 10 and a power management integrated circuit (PMIC) 11. The digital board 2 is further equipped with a memory (MEMORY) 13, an interface unit (I/F) 14, and a decoder (DECODER) 15. The CPU 10 corresponds to a computing unit. The PMIC 11 corresponds to a power source management unit.

The memory 13 stores an operation program to be executed by the CPU 10. The CPU 10 reads out the operation program stored in the memory 13 and executes the operation program. By executing the operation program, the CPU 10 processes high-capacity digital data such as image data and music data. To process high-capacity digital data, the CPU 10 on the digital board 2 uses software whose capacity is higher than the software referred to as a real time OS (Operating System). The CPU 17 on the interface board 3 uses the real time OS, which is to be described later in detail. When the supply of the operation power source starts, the CPU 10 on the digital board 2 performs a startup preparation such as loading the OS, and then starts operation. The use of the high-capacity software requires a certain amount of time for the startup preparation. The time needed for the startup preparation depends on a type of OS that is to be loaded by the CPU 10 on the digital board 2.

The PMIC 11 supplies the CPU 10 with the power supplied from the interface board 3 via the connection cable 4 as the operation power source. The PMIC 11 also manages the operation power source of the CPU 10. Specifically, the PMIC 11 periodically receives, from the CPU 10, a state notification command that indicates a state of the CPU 10. The PMIC 11 determines the state of the CPU 10 and controls the operation power source to be supplied to the CPU 10 according to the state of the CPU 10. When the PMIC 11 determines that the CPU 10 is in a low load state (e.g., idling state), the PMIC 11 decreases the power of the operation power source supplied to the CPU 10 for the sake of energy saving. On the other hand, when the PMIC 11 determines that the CPU 10 is in a high load state, the PMIC 11 increases the power of the operation power source supplied to the CPU 10 for the sake of high processing speed.

The PMIC 11 periodically transmits an inquiry command to the CPU 10 to inquire whether or not the CPU 10 is supplied with normal power of the operation power source. When the CPU 10 receives the inquiry command from the PMIC 11 and the power of the operation power source supplied from the PMIC 11 is normal, the CPU 10 transmits a response command to the PMIC 11 to indicate that the power of the operation power source is normal. On the other hand, when the power of the operation power source supplied from the PMIC 11 is not normal (or may be abnormal), the CPU 10 transmits a response command to the PMIC 11 to indicate that the power of the operation power source is abnormal. The PMIC 11 determines that the power of the operation power source for the CPU 10 is normal when receiving the response command from the CPU 10 indicating that the power of the operation power source is normal. On the other hand, the PMIC 11 determines that the power of the operation power source for the CPU 10 is abnormal when receiving the response command from the CPU 10 indicating that the power of the operation power source is abnormal or when failing to receive the response command indicating that the power of the operation power source is normal within a specified period time from a time point at which the inquiry command is transmitted.

As will be described in detail later, the PMIC 11 receives a reset signal from a CPU 17 on the interface board 3. According to the type of the received reset signal, the PMIC 11 determines whether to reset only the CPU 10 on the digital board 2 (partial portion of the digital data processing unit 12) or reset both the PMIC 11 and the CPU 10 on the digital board 2 (the whole portion of the digital data processing unit 12). Specifically, when receiving a first reset signal, the PMIC 11 transmits a reset command to the CPU 10 to reset only the CPU 10 without resetting the PMIC 11. When receiving a second reset signal, the PMIC 11 resets itself and the CPU 10. In more detail, resetting of the PMIC 11 instantaneously stops supply of the operation power source to the CPU 10, and consequently, causes a reset of the CPU 10. When receiving an operation restriction signal from the CPU 17 on the interface board 3, the PMIC 11 transmits an operation restriction command to the CPU 10 to restrict operation (to reduce the load) executed by the CPU 10 on the digital board 2.

The interface unit 14 provides a signal line for commands transmitted from the CPU 10 to the PMIC 11 and a signal line for commands transmitted from the PMIC 11 to the CPU 10. The interface unit 14 receives a command transmitted from the CPU 10 to the PMIC 11 or a command transmitted from the PMIC 11 to the CPU 10. The interface unit 14 transmits the received command to the interface board 3 via the connection cable 4. The decoder 15 receives drawing data from the CPU 10. The decoder 15 then decodes the received drawing data and displays an image corresponding to the drawing data on a display device (DISPLAY) 16 including a liquid crystal display, for example.

The interface board 3 is mounted with the CPU 17, a power source control unit (PW SC CONT) 18, a memory (MEMORY) 19, an operation receiving unit (OPERATE RECV) 20, and a decoder (DECODER) 21. The CPU 17 corresponds to a control unit. The memory 19 corresponds to a storage unit. The decoder 21 corresponds to an information output unit. One of the operation receiving unit 20 or the decoder 21 functions as a user interface unit. Alternatively, both the operation receiving unit 20 and the decoder 21 function as a user interface unit.

The memory 19 stores an operation program to be executed by the CPU 17. The CPU 17 reads out the operation program stored in the memory 19 and executes the operation program. By executing the operation program, the CPU 17 on the interface board 3 receives, via the interface unit 14, a command transmitted from the CPU 10 on the digital board 2 to the PMIC 11 or a command transmitted from the PMIC 11 to the CPU 10 on the digital board 2. With this configuration, the CPU 17 monitors operation of the digital data processing unit 12. By executing the operation program, the CPU 17 on the interface board 3 transmits the above-mentioned first or second reset signal to the digital data processing unit 12 and controls the digital data processing unit 12.

A vehicle power source (VH PW SC) is supplied from an onboard battery (not shown) equipped to the vehicle. The power source control unit 18 supplies the vehicle power source as an operation power source to the CPU 17 on the interface board 3, and supplies the vehicle power source to the PMIC 11 of the digital board 2 via a connection connector 4. For example, suppose that the user operates an operation unit (OPERATE) 22 such as a touch button displayed on a display device 23 that includes a liquid crystal display. In this case, the operation receiving unit 20 receives an operation detection signal from the operation unit 22, and transmits the received operation detection signal to the CPU 17 on the interface board 3. When receiving drawing data from the CPU 17 on the interface board 3, the decoder 21 decodes the received drawing data and displays the image corresponding to the drawing data on the display device 23.

The vehicular data processing device 1 according to the above-mentioned configuration turns the power source on or off corresponding to on or off state of an accessory (ACC) switch. When the ACC switch turns from the off state to the on state, the vehicular data processing device 1 starts (turn on) a supplying of vehicle power source. Specifically, vehicle power source from the onboard battery is provided to the power source control unit 18. When the ACC switch turns from the on state to the off state, the vehicular data processing device 1 stops (turn off) the supplying of the vehicle power source. Specifically, the vehicle power source from the onboard battery is forbidden to be provided to the power source control unit 18. The CPU 10 on the digital board 2 requires a longer time for startup (i.e., startup time) than the CPU 17 on the interface board 3. Herein, startup time is a period of time which is necessary for a startup operation of the CPU right after the supply of the operation power source to the CPU. For example, the CPU 10 is suitable for processing high-capacity entertainment-related data such as image data and music data (processing specialized for user applications). On the other hand, compared with the CPU 10 on the interface board 2, the CPU 17 on the interface board 3 requires a shorter startup time, which is a period of time necessary for a startup operation of the CPU right after the supply of the operation power source to the CPU. The CPU 17 is suitable for processing data related to the vehicle control (processing specialized for the vehicle control).

The display device 23 connected with the interface board 3 functions as a main display. The display device 16 connected with the digital board 2 functions as an auxiliary display. According to the above-mentioned configuration, the operation unit 22 and the display device 23 connected with the interface board 3 function as the user interface. The functional unit (digital board 2) for processing digital data is separated from the functional unit (interface board 3) for controlling the user interface.

As described above, the CPU 10 on the digital board 2 processes high-capacity data. However, in some cases, an application implemented based on high-capacity data may require a resource (e.g., storage capacity and operation speed) that exceeds the processing capacity of the CPU 10 on the digital board 2. When executing this kind of application, an operation delay or an operation stop may occur to the CPU 10 on the digital board 2, and the operation delay or operation stop may cause abnormal operation of the digital data processing unit 12. In particular, suppose that the vehicular data processing device 1 is connected with an unspecified number of servers (not shown) via a communication line to process high-capacity data delivered from the servers. In such case, the size or structure of the data is determined regardless of the processing capacity of the CPU 10 on the digital board 2. Thus, in this case, above-mentioned abnormality is highly likely to occur to the CPU 10 on the digital board 2. The present disclosure assumes a case where the digital data processing unit 12 operates in an abnormal manner by some reasons. Even when the digital data processing unit 12 operates abnormally, the present disclosure can provide an appropriate remedy.

Figure 3A:
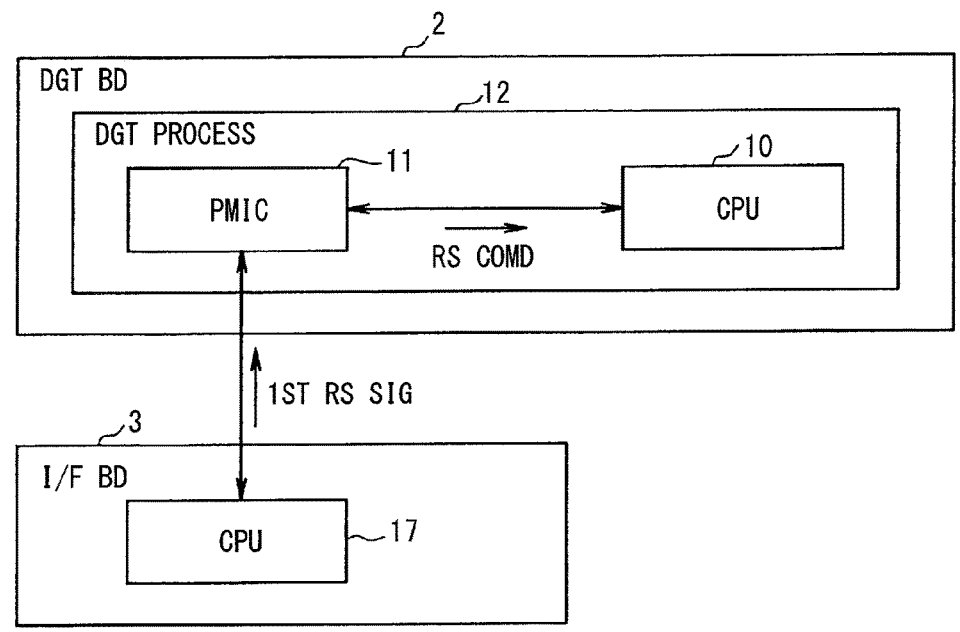
FIG. 3A is a diagram illustrating transmission of a first reset signal by a CPU on the interface board.
Figure 3B:
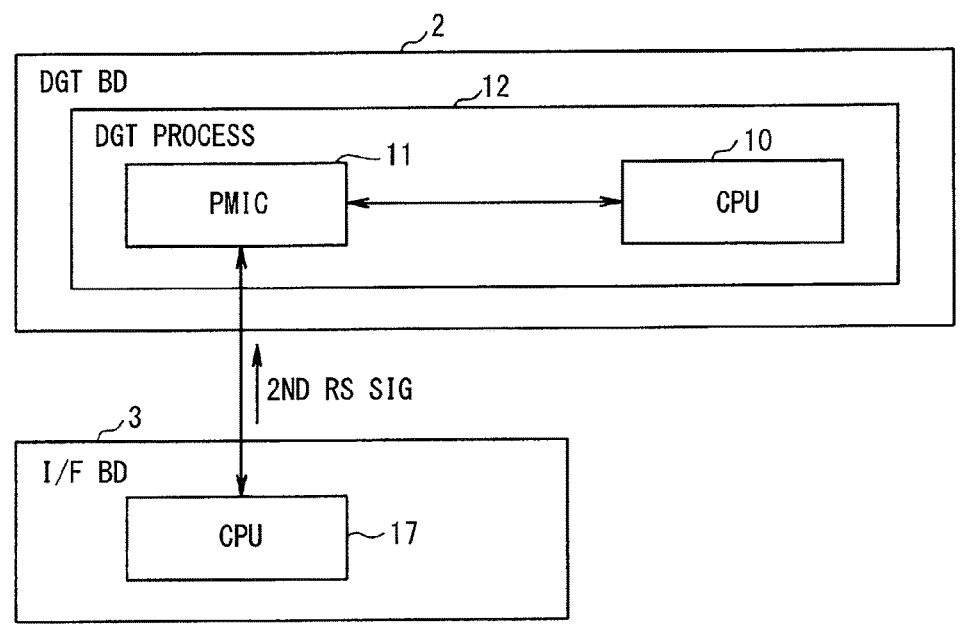
FIG. 3B is a diagram illustrating transmission of a second reset signal by a CPU on the interface board.
Figure 4:
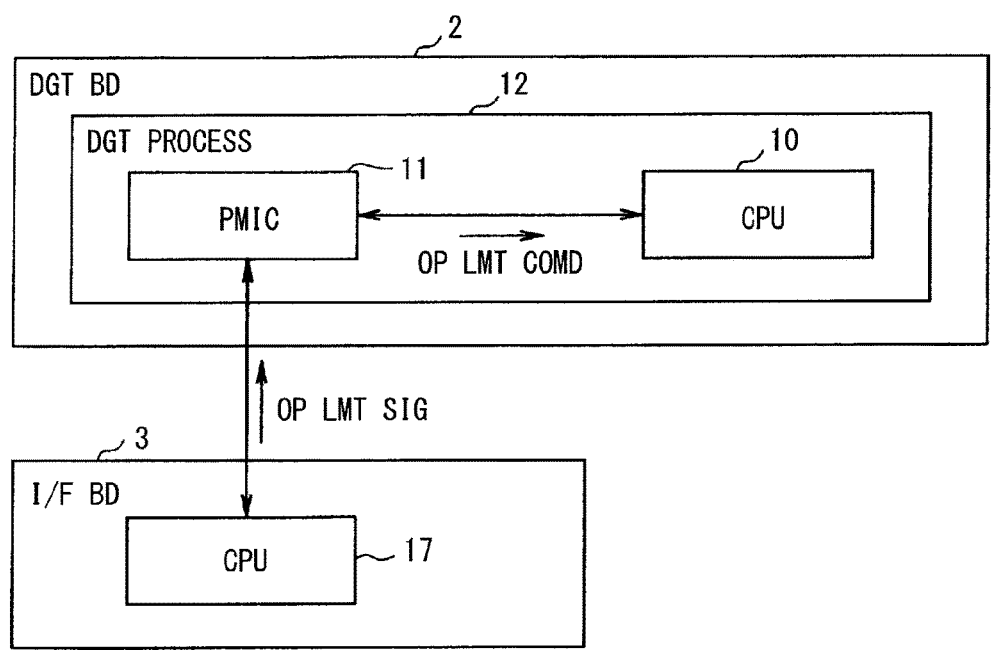
FIG. 4 is a diagram illustrating transmission of an operation restriction signal by a CPU on the interface board.

Operations of the above-mentioned configuration will be described with reference to FIGS. 2 through 4.

As shown in FIG. 2, when the user (driver) changes the ACC switch from the off state to the on state, the interface board 3 starts supplying the vehicle power source provided by the onboard battery (A1) to the power source control unit 18. When the onboard battery starts supplying the vehicle power source, the power source control unit 18 starts supplying the operation power source to the CPU 17 on the interface board 3 (A2) and starts supplying the operation power source to the PMIC 11 on the digital board 2 (A3). The CPU 17 on the interface board 3 is activated, that is, starts operation when the power source control unit 18 starts supplying the operation power source (A4).

On the digital board 2, the PMIC 11 is activated (B1) when the power source control unit 18 on the interface board 3 starts supplying the operation power source to the PMIC 11. When activated, the PMIC 11 starts transmitting PMIC diagnosis information to the interface unit 14 (B2) and starts supplying the operation power source to the CPU 10 on the digital board 2 (B3). The PMIC diagnosis information indicates an operation state of the PMIC 11, and the operation state of the PMIC 11 can be specified based on the PMIC diagnosis information. The interface unit 14 transmits the PMIC diagnosis information transmitted from the PMIC 11 to the CPU 17 on the interface board 3 via the connection cable 4.

On the interface board 3, at a time when receiving the PMIC diagnosis information from the PMIC 11, the CPU 17 on the interface board 3 is already in an activated state and is ready for analyzing the PMIC diagnosis information and diagnosing operation of the PMIC 11. The CPU 17 on the interface board 3 analyzes the received PMIC diagnosis information and starts diagnosis of the PMIC 11 (A5). When starting diagnosing the PMIC 11, the CPU 17 on the interface board 3 allows the display device 23 to display a digital board diagnosis start screen indicating that the diagnosis of the digital board 2 has started (A6). The user can be notified of the start of diagnosis to the digital board 2 by confirming the digital board diagnosis start screen. Alternatively, the digital board diagnosis start screen may not be displayed.

On the digital board 2, the CPU 10 on the digital board 2 performs startup preparation such as loading the OS (B4) when operation power source is supplied from the PMIC 11. When the CPU 10 on the digital board 2 terminates a normal startup preparation, the CPU 10 is activated (B5). Then, the CPU 10 starts to transmit diagnosis information, which indicates the operation state of itself, to the interface unit 14 (B6). Based on the diagnosis information, the operation state of the CPU 10 can be specified. The interface unit 14 receives the diagnosis information about the CPU 10 on the digital board 2 from the CPU 10 on the digital board 2, and transmits the received diagnosis information to the CPU 17 on the interface board 3 via the connection cable 4. When started, the CPU 10 on the digital board 2 transmits drawing data to the decoder 15, and allows the display device 16 to display an in-operation screen for the CPU 10 on the digital board 2 to indicate that the CPU 10 has started (B7). The user can be notified of the start of the CPU 10 on the digital board 2 by viewing the in-operation screen for the CPU 10 on the digital board 2. Alternatively, the in-operation screen for the CPU 10 on the digital board 2 may not be displayed.

On the interface board 3, the CPU 17 on the interface board 3 receives the diagnosis information about the CPU 10 on the digital board 2 from the CPU 10 on the digital board 2, analyzes the diagnosis information, and starts diagnosing of the CPU 10 on the digital board 2 (A7). The CPU 17 on the interface board 3 starts storing diagnosis log information in the memory 13 (A8). In this case, the CPU 17 on the interface board 3 may store only a result of diagnosing of the CPU 10 on the digital board 2 as the diagnosis log information. The CPU 17 may store a result of diagnosing of the PMIC 11 and a result of diagnosing of the CPU 10 on the digital board 2 as the diagnosis log information. The CPU 17 on the interface board 3 stores the PMIC diagnosis information and the diagnosis information about the CPU 10 on the digital board 2, and thereby, determines whether an error occurs in the operation of the digital data processing unit 12 (A9).

The CPU 17 on the interface board 3 monitors states of command receiving from the PMIC 11 or the CPU 10 on the digital board 2 via the interface unit 14. The CPU 17 compares the states (e.g., command types and transfer timing) of commands transferred between the PMIC 11 and the CPU 10 on the digital board 2 with previously stored normal states of command transfer. Based on the comparison result, the CPU 17 on the interface board 3 determines whether or not an error occurs in the operation of the digital data processing unit 12. When determining that an error occurs, the CPU 17 determines an error level.

For example, suppose that a delay occurs when a specific command is transferred between the PMIC 11 and the CPU 10 on the digital board 2. In such case, the CPU 17 on the interface board 3 determines based on the delay time whether to reset the PMIC 11 or the CPU 10 on the digital board 2. The CPU 17 transmits a reset signal to the PMIC 11 (A10). For example, there may be a case where the delay time exceeds a first specified time period but does not exceed a second specified time period. The second specified time period is longer than the first specified time period. In this case, the CPU 17 on the interface board 3 determines that the PMIC 11 need not be reset but the CPU 10 on the digital board 2 needs to be reset. In this case, the CPU 17 on the interface board 3 transmits a first reset signal (1ST RS SIG) to the PMIC 11 as illustrated in FIG. 3A. On the other hand, there may be a case where the delay time exceeds the second specified time period. In this case, the CPU 17 on the interface board 3 determines that both the PMIC 11 and the CPU 10 on the digital board 2 need to be reset. In this case, the CPU 17 on the interface board 3 transmits a second reset signal (2ND RS SIG) to the PMIC 11 as illustrated in FIG. 3B. Techniques of determining error levels include a method of determining sequence normality (whether or not a command is transferred according to a predetermined sequence) as well as the above-mentioned method of determining the delay time.

After transmitting the first reset signal or the second reset signal, the CPU 17 on the interface board 3 determines whether or not the error is removed (reset normally) (A11). To do this, the CPU 17 analyzes the PMIC diagnosis information successively transmitted from the PMIC 11 or the diagnosis information about the CPU 10 on the digital board 2 successively transmitted from the CPU 10 on the digital board 2. When determining that the error is removed (A11: YES), the CPU 17 on the interface board 3 stops transmitting the first reset signal or the second reset signal, and returns to A9 described above. Then, the CPU 17 determines again whether or not an error occurs in the operation of the digital data processing unit 12. When determining that the error is not removed (A11: NO), the CPU 17 on the interface board 3 returns to A10 described above and repeatedly transmits the first reset signal or the second reset signal until determining that the error is removed. The CPU 17 on the interface board 3 transmits the first reset signal or the second reset signal regardless of an operation detection signal transmitted from the operation receiving unit 20 or drawing data output to the decoder 21. Namely, the user's manipulation on the operation unit 22 can be accepted or an image can be displayed on the display device 23 even while the first reset signal or the second reset signal is being transmitted. In other words, the digital data processing unit 12 can be reset independently of the user interface function because the function block to process digital data is separated from the function block to implement the user interface function.

On the digital board 2, the PMIC 11 determines whether the first reset signal or the second reset signal is transmitted from the CPU 17 on the interface board 3 (B8). The PMIC 11 determines whether or not the entire parts of the digital board 2 needs to be reset (B9). Specifically, the PMIC 11 determines whether only the CPU 10 on the digital board 2 needs to be reset (a part of the digital data processing unit 12, B9: NO) or both the PMIC 11 and the CPU 10 on the digital board 2 need to be reset (the whole of the digital data processing unit 12, B9: YES).

When the PMIC 11 determines that the first reset signal is transmitted from the CPU 17 on the interface board 3, the PMIC 11 transmits a reset command (RS COMD) to the CPU 10 on the digital board 2 as illustrated in FIG. 3A. The PMIC 11 thereby resets the CPU 10 on the digital board 2 without resetting the PMIC 11 itself. When being reset, the CPU 10 on the digital board 2, which has been activated, temporarily stops operation, and performs the startup preparation (B4) again. Then, the CPU 10 performs the process after B4 again. When the PMIC 11 determines that the second reset signal is transmitted from the CPU 17 on the interface board 3, the PMIC 11 returns to B1 and resets itself and the CPU 10 on the digital board 2. When the PMIC 11 is reset, the PMIC 11 instantaneously stops supplying the operation power source to the CPU 10 on the digital board 2. Thus, resetting of the PMIC 11 consequently resets the CPU 10 on the digital board 2. The PMIC 11, which has been activated, temporarily stops operation and restarts operation (B1), and then performs the process after B1 again.

The CPU 17 on the interface board 3 analyzes the PMIC diagnosis information transmitted from the PMIC 11 or the diagnosis information of the CPU 10 on the digital board 2 transmitted from the CPU 10 on the digital board 2. When the CPU 17 determines that the CPU 10 on the digital board 2 is highly loaded and the operation of the CPU 10 on the digital board 2 needs to be restricted, the CPU 17 transmits an operation restriction signal (OP LMT SIG) to the PMIC 11 to restrict the operation of the CPU 10 on the digital board 2 (to reduce the load) as illustrated in FIG. 4. Specifically, when receiving the operation restriction signal, the PMIC 11 transmits the operation restriction command (OP LMT COMD) to the CPU 10 on the digital board 2 to restrict the operation load of the CPU 10 on the digital board 2.

As described above, the vehicular data processing device 1 according to the present embodiment includes the digital board 2 and the interface board 3 separated from each other. The digital board 2 includes the digital data processing unit 12 that processes digital data. The interface board 3 implements the user interface function. When the digital data processing unit 12 operates abnormally, the vehicular data processing device 1 resets the abnormal operation of the digital data processing unit 12 without disabling the user interface function. This configuration enables a proper reset of the digital data processing unit 12 when an abnormality occurs to the digital data processing unit 12. At the same time, the user interface function is still in an enabled state while the digital data processing unit 12 is being reset. Thus, even if the user does not perform a reset manipulation on the device, the vehicular data processing device 1 can reset the abnormal operation of the digital data processing unit 12, and prevents the error from being remained.

According to an error level, the vehicular data processing device 1 provides an option to reset only the CPU 10 on the digital board 2 or to reset both the PMIC 11 and the CPU 10 on the digital board 2. This enables to prevent a case where the reset of PMIC 11 is carried out even though the PMIC 11 need not be reset. With this configuration, the digital data processing unit 12 can be reset effectively. The vehicular data processing device 1 restricts operation of the CPU 10 on the digital board 2 as needed. This configuration prevents the CPU 10 on the digital board 2 from continuously being highly loaded and repeating an error occurrence.

A result of diagnosing operation of the digital data processing unit 12 is stored as the diagnosis log information. Analyzing the diagnosis log information can troubleshoot abnormal operation of the digital data processing unit 12. The diagnosis log information can be used for later operation (e.g., to anticipate an error). The digital board 2 equipped with the digital data processing unit 12 is attachable to or detachable from the interface board 3 that implements the user interface function. Replacing the digital board 2 as needed makes it possible to flexibly comply with various applications to use digital data without changing the user interface configuration.

The present disclosure is not limited to the above-mentioned embodiment but may be modified or enhanced as follows.

According to the above-mentioned embodiment, the digital board 2 equipped with the digital data processing unit 12 is separated from the interface board 3 equipped with the CPU 17. The CPU 17 on the interface board 3 provides the user interface function. The present disclosure is not limited to above-described configuration. For example, the digital data processing unit 12 and the CPU 17 on the interface board 3 may be mounted on the same board under a condition that the digital data processing unit 12 is separated from the CPU 17.

One display device may be changed to another display device depending on the timing to start the CPU 17 on the interface board 3. For example, the display device 16 displays an image before the startup of the CPU 17 on the interface board 3, and the display device 23 displays an image after the CPU 17 on the interface board 3 is started up. As another example, the display device 16 connected to the digital board 2 may be omitted. As another example, the display device 16 connected to the digital board 2 or the display device 23 connected to the interface board 3 may be integrated as one display device.

The user interface may provide only one function. For example, the user interface may provide only a function to accept user manipulation, or only a function to decode drawing data and display an image.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

The invention claimed is:

1. A data processing device comprising:
   a digital data processing unit including a computing unit and a power source management unit, the computing unit computing digital data, and the power source management unit transceiving commands with the computing unit and managing a power supply to the computing unit; and
   a control unit controlling a user interface unit that provides a user interface function, wherein
   the control unit diagnoses an operation of the digital data processing unit by monitoring a transfer state of the commands between the computing unit and the power source management unit, and
   when determining an abnormality occurrence in the operation of the digital data processing unit, the control unit resets all parts of the digital data processing unit or a part of the digital data processing unit without interrupting an operation of the user interface unit.

2. The data processing device according to claim 1, wherein
   the control unit transmits a first reset signal to the power source management unit when determining that a reset of the computing unit is necessary and a reset of the power source management unit is not necessary in the digital data processing unit,
   the power source management unit receives the first reset signal from the control unit and transmits a reset command to the computing unit in response to the first reset signal, and
   the computing unit performs a reset process when receiving the reset command from the power source management unit.

3. The data processing device according to claim 1, wherein
   the control unit transmits a second reset signal to the power source management unit when determining that both a reset of the computing unit and a reset of the power source management unit are necessary in the digital data processing unit,
   the power source management unit performs a reset process when receiving the second reset signal from the control unit, and
   the computing unit performs a reset process cooperatively with the reset process of the power source management unit.

4. The data processing device according to claim 1, wherein
   the control unit transmits an operation restriction signal to the power source management unit when determining that an operation of the computing unit needs to be restricted in the digital data processing unit, and
   the power source management unit restricts the operation of the computing unit when receiving the operation restriction signal from the control unit.

5. The data processing device according to claim 1, further comprising:
   a storage unit storing a diagnosis log information indicating a result of a diagnosis made by the control unit to all parts of the digital data processing unit or to a part of the digital data processing unit.

6. The data processing device according to claim 1, wherein the user interface unit includes at least one of an operation receiving unit receiving an operation made by a user or an information output unit outputting information to the user.

7. The data processing device according to claim 1, wherein
the digital data processing unit is equipped to a first board,
the control unit is equipped to a second board different from the first board, and
the first board is attachable to and detachable from the second board.

8. The data processing device according to claim 7, wherein
the data processing device mountable on a vehicle,
the first board performs a process specific to a user application, and
the second board performs a process specific to a vehicle control.

9. The data processing device according to claim 8, wherein
the first board includes a connector body of the first board,
the second board includes a connector body of the second board, and
a connection cable connects the connector body of the first board to the connector body of the second board.

10. The data processing device according to claim 1, wherein
the control unit and the user interface unit are separated from the digital data processing unit and operate independently from the digital data processing unit such that the control unit independently resets at least one part of the digital data processing unit without interrupting the operation of the user interface unit.

11. The data processing device according to claim 1, wherein
the control unit and the user interface unit are connected to a main display, and
the digital data processing unit is connected to an auxiliary display different from the main display.

12. The data processing device according to claim 1, wherein
the computing unit has a processing capacity, and
the abnormality in the operation of the digital data processing unit is that a processing load of the computing unit exceeds the processing capacity of the computing unit.

13. The data processing device according to claim 1, wherein
the control unit selectively resets one or both of the computing unit and the power source management of the digital data processing unit.

14. The data processing device according to claim 1, wherein
the control unit continually sends a reset command to reset all parts of the digital data processing unit or a part of the digital data processing unit, and
the control unit determines whether the abnormality is removed and subsequently stops sending the reset command in response to determining that the abnormality has been removed.

* * * * *